United States Patent
Osawa et al.

(10) Patent No.: US 6,392,983 B1
(45) Date of Patent: May 21, 2002

(54) OPTICAL DISC APPARATUS AND METHOD FOR CONTROLLING TURNTABLE ROTATION

(75) Inventors: Hiroshi Osawa; Yasunori Kuwayama, both of Daito (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 09/699,911

(22) Filed: Oct. 30, 2000

Related U.S. Application Data

(62) Division of application No. 09/174,778, filed on Oct. 19, 1998, now Pat. No. 6,252,841.

(30) Foreign Application Priority Data

Oct. 30, 1997 (JP) ............................................ 9-298657

(51) Int. Cl.[7] ............................................. G11B 19/20
(52) U.S. Cl. ...................................... 369/267; 369/264
(58) Field of Search ................................. 369/263, 247, 369/251, 264, 266; 360/98.07, 98.08, 99.04, 99.05, 99.12, 99.08

(56) References Cited

U.S. PATENT DOCUMENTS

| | | | | |
|---|---|---|---|---|
| 4,060,009 A | * | 11/1977 | Wyman | 74/573 |
| 4,075,909 A | * | 2/1978 | Deakin | 74/573 |
| 4,674,356 A | * | 6/1987 | Kilgore | 74/573 |
| 5,111,713 A | * | 5/1992 | Cameron et al. | 74/573 |
| 5,256,037 A | * | 10/1993 | Chatelain | 417/423.7 |
| 5,391,952 A | * | 2/1995 | Simazu et al. | 310/67 |
| 5,845,542 A | * | 12/1998 | Hannah et al. | 74/573 |
| 5,862,553 A | * | 1/1999 | Haberl et al. | 8/159 |
| 5,903,540 A | * | 5/1999 | Ro et al. | 369/263 |
| 6,198,715 B1 | * | 3/2001 | Kuono et al. | 369/263 |

FOREIGN PATENT DOCUMENTS

| | | | |
|---|---|---|---|
| JP | 57-20915 | * | 2/1982 |
| JP | 62-24052 | * | 2/1987 |
| JP | 3-290890 | * | 12/1991 |

* cited by examiner

*Primary Examiner*—Brian E. Miller
*Assistant Examiner*—Kenneth W. Fields
(74) *Attorney, Agent, or Firm*—Lackenbach Siegel Marzullo Aronson & Greenspan

(57) ABSTRACT

An optical disc apparatus includes a turntable. The turntable is first rotated at a low speed in response to turning on of a reproduce switch on the disc apparatus, and the balancer is, in turn, brought to rest at an optimal position for low speed rotation. When the balancer comes to rest, automatic adjustment is effected. When the automatic adjustment is ended, the turntable is decelerated in rotation to release the balancer from resting. When the rotation speed of the turntable reaches a speed at which the balancer is released from resting, the balancer becomes movable relative to the turntable. Thereafter the turntable is brought into high speed rotation to move the balancer to rest at an optimal position for high speed rotation.

4 Claims, 4 Drawing Sheets

F I G. 1
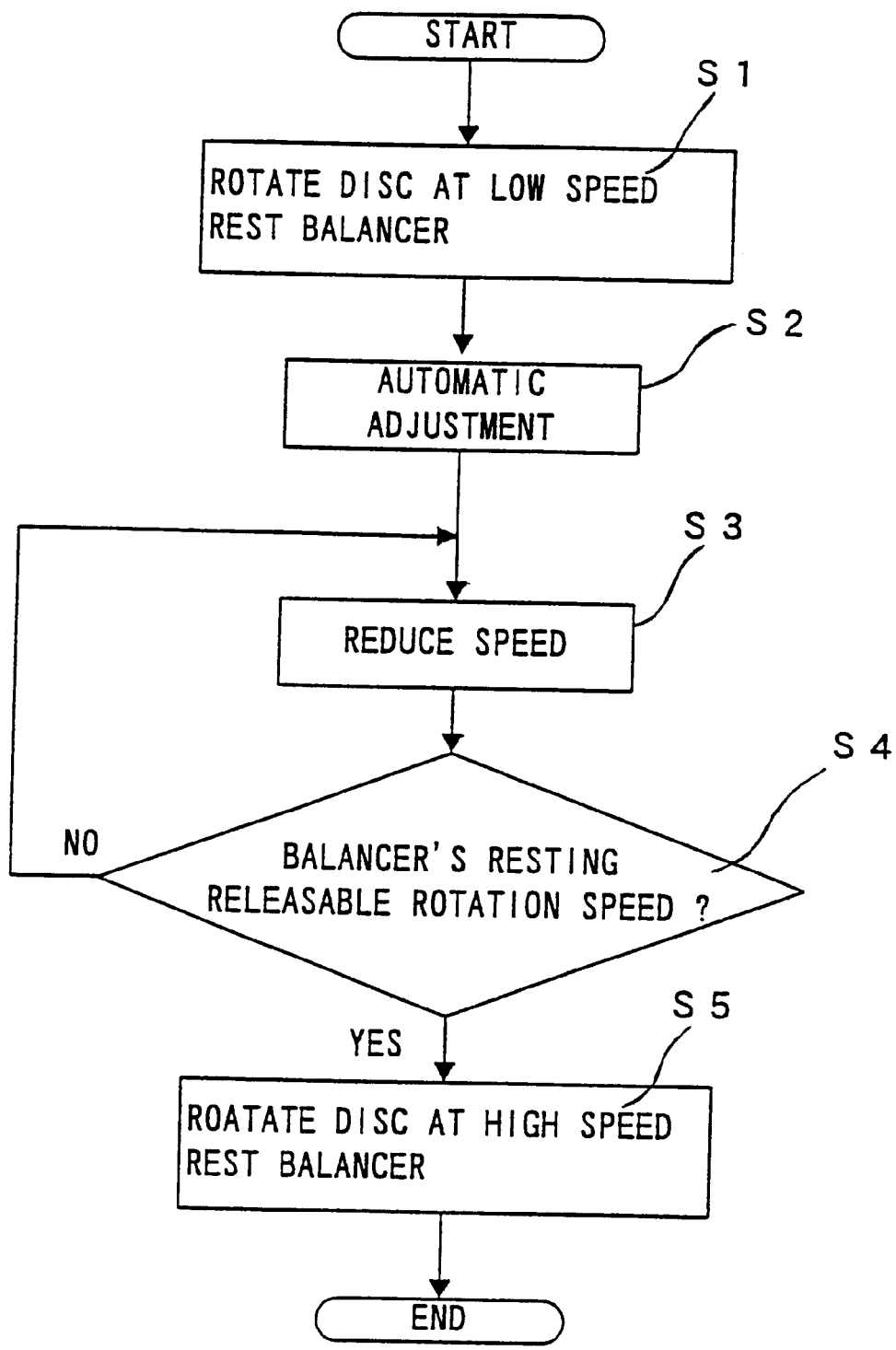

OPTICAL DISC APPARATUS AND METHOD FOR CONTROLLING TURNTABLE ROTATION

This application is a divisional of U.S. Ser. No. 09/174,778, filed Oct. 19, 1998, now U.S. Pat. No. 6,252,842 B1 issued on Jun. 26, 2001.

BACKGROUND OF THE INVENTION

1. Field of the Invention

This invention relates to an optical disc apparatus and method for controlling turntable rotation, and more particularly to an optical disc apparatus having a turntable arranged to mount thereon an optical disc, such as CD-ROM, CD-RW, DVD and so on, and having a vibration suppressing function, such as with a balancer, and a method for controlling turntable rotation.

2. Prior Art

The present applicant has disclosed, in Japanese Utility Model Registration Application No. H9-6240, one example of a turntable having a vibration suppressing function. This turntable has a balancer accommodated within an annular space formed coaxially to a rotation center of its main body. During reproduction with a disc, the balancer automatically comes to rest at a predetermined position in response to an eccentricity of the turntable gravity center, thereby keeping the turntable in balanced rotation and hence suppressing against vibrations.

In the above-mentioned turntable, the optimal position of the balancer is different depending upon rotation speed of the turntable. On the other hand, the balancer once brought into rest will not readily move even if the turntable rotation speed is varied. Accordingly, where the rotation speed of the turntable is increased from a speed of 4 times the normal speed up to a speed of 32 times the normal speed, the turntable rotates at the 32-times speed in spite that the balancer remains resting at an optimal position for the 4-times speed. Due to this, there has been a difficulty in suppressing vibrations to a sufficient extent when the turntable is rotated at the 32-times speed.

SUMMARY OF THE INVENTION

It is therefore a primary object of the present invention to provide a method for controlling turntable rotation by which vibration is sufficiently suppressed at every rotation speed even where the rotation speed of the turntable is varied.

It is another primary object of the present invention to provide an optical disc apparatus which is capable of sufficiently suppressing vibration at every rotation speed even where the rotation speed of the turntable is varied.

An optical disc apparatus according to the present invention, comprises: a turntable for mounting an optical disc thereon; an annular space formed coaxially to a rotation center of the turntable; a balancer accommodated movable within the space; a first rotating means which causes the turntable to rotate at a first rotation speed to thereby cause the balancer to rest at a first position within the space; a decelerating means which decelerate the turntable to cause acceleration between the turntable and the balancer to thereby release the balancer from resting; and a second rotating means which causes the turntable to rotate at a second rotation speed higher than the first rotation speed to thereby cause the balancer to rest at a second position within the space.

A control method according to the present invention, comprises the steps of: (a) a step of rotating the turntable at a first rotation speed to rest the balancer at a first position within the space; (b) a step of decelerating the turntable to cause acceleration between the turntable and the balancer releasing the balancer from resting; and (c) a step of rotating the turntable at a second rotation speed higher than the first rotation speed to bring the balancer to rest at a second position within the space.

In this optical disc or control method, the turntable is rotated at the first rotating speed to cause the balancer to rest at an optimal position for the first rotation speed. Then brake is applied to a motor to decelerate the turntable causing acceleration between the turntable and the balancer and releasing the balancer from resting. Thereafter the turntable is rotated at the second rotation speed higher than the first rotation speed to bring the balancer to rest at an optimal position for the second rotation speed. Therefore, the turntable can be kept in balanced rotation for both first and second rotation speeds.

An optical disc apparatus according to the present invention, comprises: a turntable for mounting an optical disc thereon; an annular space formed coaxially to a rotation center of the turntable; a balancer accommodated movable within the space; a first rotating means which causes the turntable to rotate at a first rotation speed to thereby cause the balancer to rest at a first position within the space; and a second rotating means which causes the turntable to rotate at a second rotation speed higher than a rotation speed at which the balancer is released from resting but is lower than a first rotation speed.

A control method according to the present invention, comprises the steps of: (a) a step of rotating the turntable at a first rotation speed to cause the balancer to rest at a predetermined position within the space; and (b) a step of rotating the turntable at a third rotation speed that is higher than a second rotation speed at which the balancer is released from being rested but is lower than the first rotation speed.

In this other optical disc or control method, the turntable is rotated at the first rotation speed to cause the balancer to rest, and then the turntable is rotated at the third rotation speed lower than the first rotation speed. In a state that the balancer is rested at an optimal position for the first rotation speed, no vibration occurs in the turntable rotating at the third rotation speed lower than the first rotation speed.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a flowchart showing one embodiment of the present invention;

DETAILED DESCRIPTION OF THE PREFERRED EMBODIMENTS

Figure 2:
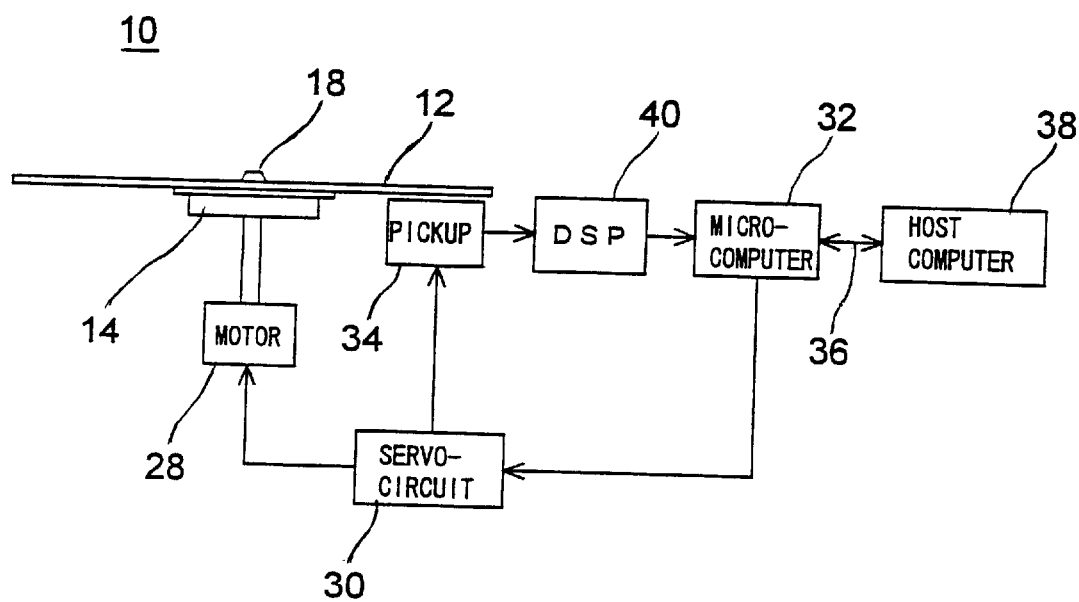
FIG. 2 is a block diagram showing a disc apparatus to which the FIG. 1 embodiment is applied.

A method for controlling turntable rotation as embodied in FIG. 1 is applicable, for example, to an optical disc apparatus 10, as shown in FIG. 2.

Figure 3:
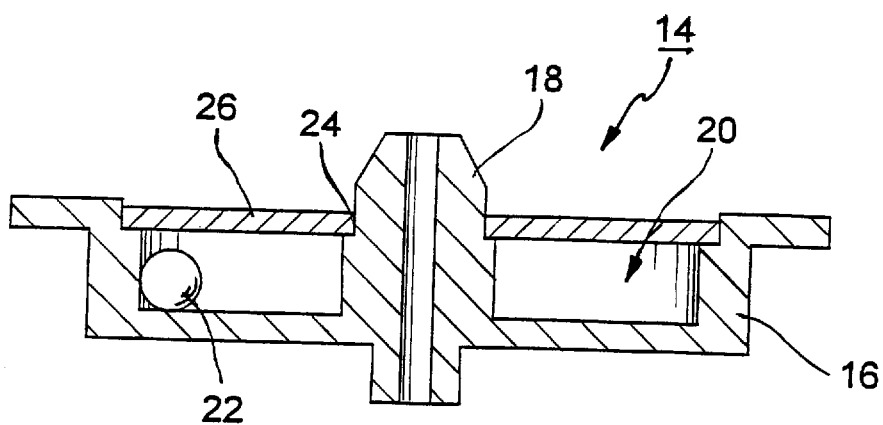
FIG. 3 is a sectional view showing a turntable.
Figure 4:
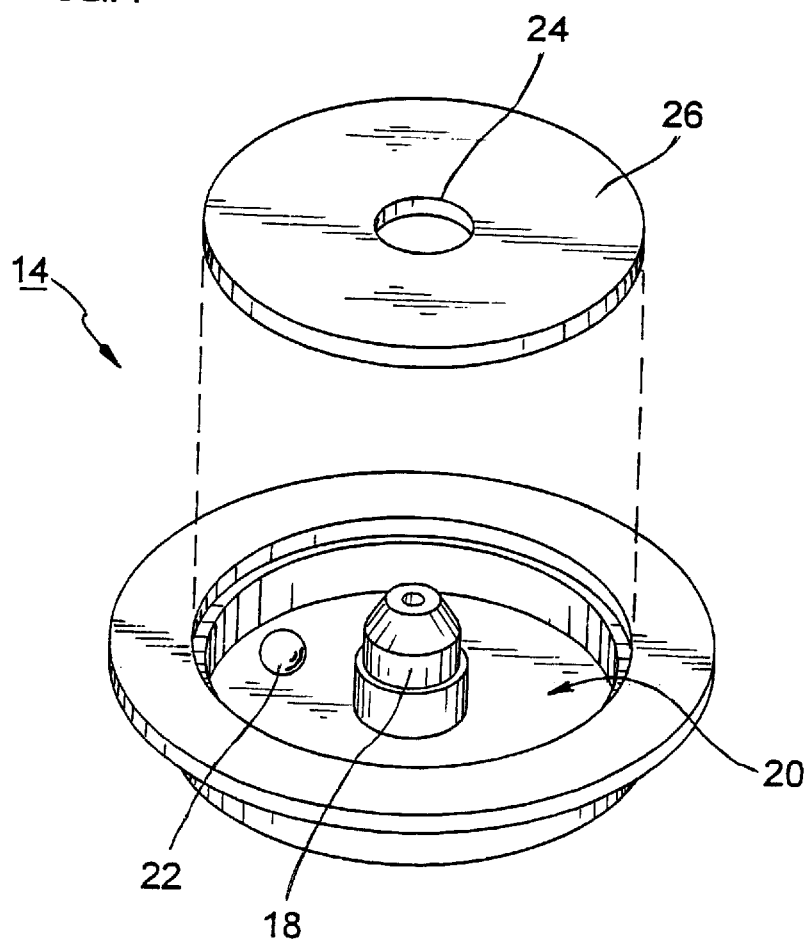
FIG. 4 is a perspective view showing the turntable.

An optical disc apparatus 10 includes a turntable 14 on which an optical disc 12 is to be mounted. As well understood from FIG. 3 and FIG. 4, the turntable 14 includes a main body 16 on which an optical disc 12 is placed. The main body 16 is formed with a rotation axis 18 at a central portion thereof. Around the rotation axis 18 is formed an annular space 20 coaxially to the rotation axis 18. A spherical balancer 22 is accommodated movable within the space 20. The balancer 22, however, may be cylindrical in shape or the like and the number thereof be two or more. A lid 26 is fitted covering over the space 20, and formed with a bore 24 through which the rotation axis is inserted. Incidentally, the turntable 14 may use one as disclosed in Japanese Utility Model Registration Application No. H9-6240 filed by the present applicant.

Referring back to FIG. 2, the rotation axis 18 of the turntable 14 is coupled to a motor 28, while the motor 28 is connected to a servo circuit 30. The servo circuit 30 is also connected with a micro-computer 32 and an optical pickup 34. The micro-computer 32 is connected to a host computer 38 via an interface cable 36. Further, the pickup 34 and the micro-computer 32 are connected to each other through a DSP (Digital Signal Processor) 40.

With such a structure, the host computer 38 supplies control data for designating a mode, such as reproduction, stoppage, FF (Fast Forward), FR (Fast Reverse) and seek, to the microcomputer 32. Based on the data the micro-computer 32 controls the servo-circuit 30 by which the pickup 34 focussing and tracking servo and the turntable 14 rotation speed are controlled. The reproduced data read by the pickup 34 is supplied to the DSP (Digital Signal Processor) 40 where it is processed of EFM demodulation, synchronizing separation, error correction, etc. and then supplied to the host computer 38 through the micro-computer 32 and the interface cable 36.

Now explanations will be made on the rotation control operation for the turntable 14 by means of the micro-computer 32, with reference to a flowchart of FIG. 1.

If a reproduce switch is turned on in a state the turntable 14 is at stoppage (the balancer 22 in a free state), the turntable 14 at a step S1 is first rotated at a low speed. Thereupon the rotation axis 18 of the turntable 14 is deflected toward an eccentric gravity center of the turntable 14, and the balancer 22, in turn, moves in a direction opposite to the eccentric gravity center and comes to a rest. That is, the balancer 22 is rested at an optimal position for the low speed rotation, thereby keeping the turntable in balanced rotation.

After elapsing a sufficient time for causing the balancer 22 to rest, automatic adjustment, including tracking offset and tracking gain, is effected at a step S2. After completing the automatic adjustment, the turntable 14 is decelerated at a step S3. It is then determined at a step S4 whether the rotation speed of the turntable 14 reaches a predetermined rotation speed (rest-releasable rotation speed) at which the balancer 22 is released from resting or not. If "YES" is determined at the step S4, the turntable 14 is rapidly accelerated up to a high speed at a step S5 so that the balancer 22 comes to rest at an optimal position of the high speed rotation. On the other hand, if "NO" is determined at the step S4, the process returns to the step S3, further decelerating the turntable 14.

According to this embodiment, the balancer 22 can be rested at an optimal position for both low speed rotation and high speed rotation. Accordingly, even when the rotation is shifted from a low speed to a high speed, the turntable 14 can be kept in balanced rotation, sufficiently suppressing against vibrations during high speed rotation.

In the above embodiment, acceleration may be caused between the rotating turntable and the balancer resting thereon, in place of deceleration to the predetermined rotation speed at which the balancer is released from the resting state. In order to cause acceleration, a brake may be applied to a motor 28 to deceleratingly accelerate the turntable thereby causing acceleration between the turntable and the balancer in inertia rotation. It is noted that, when applying a brake, a strong brief brake may be used or several weak brakes be applied in a pulsating manner.

Figure 5:
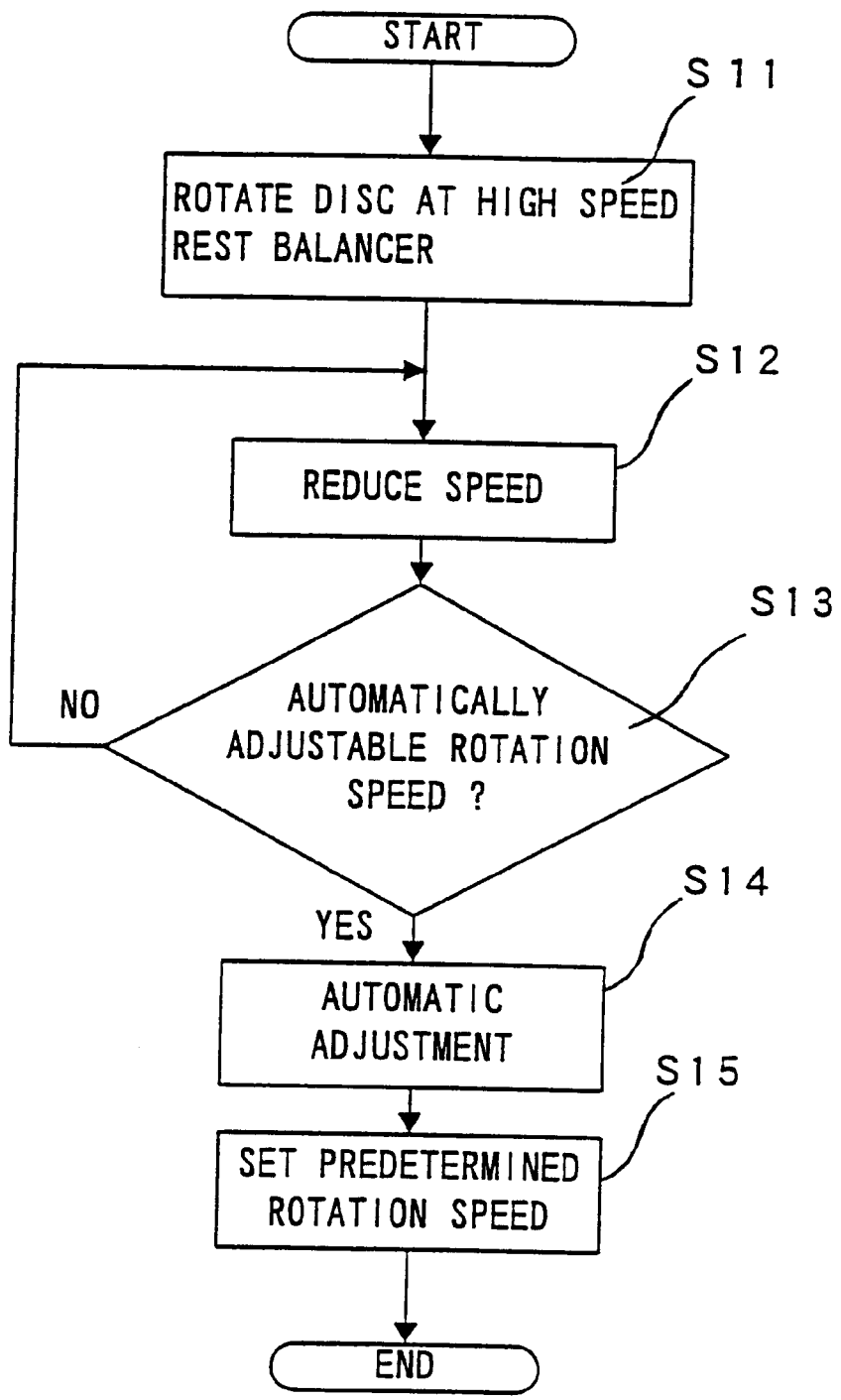
FIG. 5 is a flowchart showing another embodiment.

In a method for controlling turntable rotation according to another embodiment, the turntable 14 is controlled in rotation speed by means of the micro-computer 32 as shown in a flowchart of FIG. 5. That is, if the reproduce switch is turned on in a state that the turntable 14 is at stoppage (the balancer 22 in the free state), the turntable 14 at a step S11 is rapidly accelerated up to a high speed (e.g. 32-times speed). Thereupon the balancer 22 comes to rest at a predetermined position in conformity to an eccentric gravity center of the turntable 14 and disc 12, thus keeping the turntable 14 and disc 12 in balanced rotation.

After elapsing a time sufficient for causing the balancer 22 to rest at the predetermined position, the turntable 14 at a step S12 is decelerated (e.g. down to a 4 times speed), and then it is determined at a step S13 whether or not the rotation speed of the turntable 14 reaches a speed at which automatic adjustment is possible (automatically adjustable rotation speed). If "YES" is determined at the step S13, automatic adjustment, including tracking offset and tracking gain, is performed at a step S14. At a step S15, the turntable 14 is rotated at a predetermined rotation speed. Although during the automatic adjustment (step S14) the balancer 22 is rested at the optimal position for the high speed rotation (step S11), no vibration occurs because of low speed of turntable 14 rotation. On the other hand, if "NO" is determined at the step S13, the process returns to the step S12, further decelerating the rotation speed of the turntable 14.

According to this embodiment, arrangement is made such that the balancer 22 comes to rest at an optimal position for high speed rotation. Accordingly, even if the turntable 14 is thereafter varied in speed, the turntable 14 is sufficiently suppressed from vibrating at every rotation speed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method for controlling rotation of a turntable including a main body for mounting an optical disc thereon, an annular space formed coaxially to a rotation center of said main body, a balancer accommodated and removable within said annular space, comprising the steps of:
   (a) rotating said turntable at a first rotation speed to cause said balancer to rest at a predetermined position within said annular space; and
   (b) rotating said turntable at a second rotation speed that is higher than a rotation speed at which said balancer is released from resting but is lower than the first rotation speed; said second rotation speed being an automatically adjustable rotation speed, and said optical disc being reproduced at a third rotation speed different from said first and second speeds.

2. The method according to claim 1, wherein said balancer is a plurality of balancers selected from the group consisting of circular elements and cylindrical elements.

3. An optical disc apparatus, comprising:

a turntable for mounting an optical disc thereon;

an annular space formed coaxially to a rotation center of said turntable;

a balancer accommodated and movable within said annular space;

a first rotating means which causes said turntable to rotate at a first rotation speed to thereby cause said balancer to rest at a first position within said annular space; and a second rotating means which causes said turntable to rotate at a second rotation speed higher than a rotation speed at which said balancer is released from resting but is lower than the first rotation speed; said second rotation speed being an automatically adjustable rotation speed, and said optical disc being reproduced at a third rotation speed different from said first and second speeds.

4. The method according to claim 3, wherein said balancer is a plurality of balancers selected from the group consisting of circular elements and cylindrical elements.

* * * * *